H. A. MILLER.
CARBURETER.
APPLICATION FILED JAN. 11, 1909.
943,197.
Patented Dec. 14, 1909.
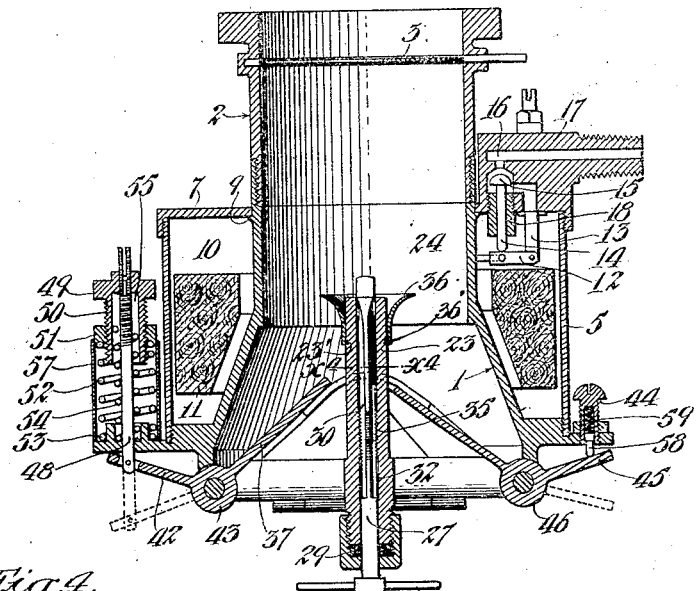
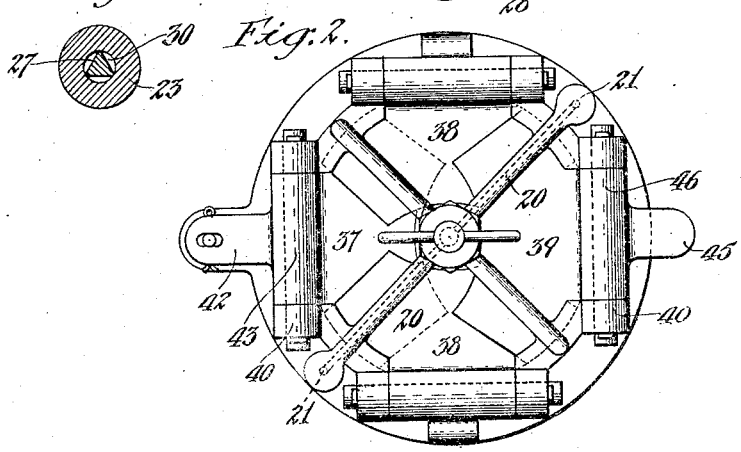
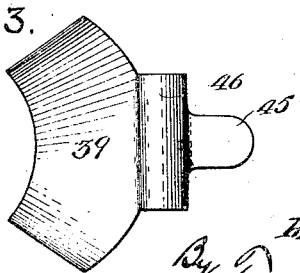
Witnesses:
Louis W. Gratz
Frank S. Graham
Inventor.
Harry A. Miller.
By Townsend, Lyon & Hackley
His Attys.

UNITED STATES PATENT OFFICE.

HARRY A. MILLER, OF LOS ANGELES, CALIFORNIA, ASSIGNOR TO MILLER CARBURETER & MANUFACTURING COMPANY, OF LOS ANGELES, CALIFORNIA, A CORPORATION OF CALIFORNIA.

CARBURETER.

943,197.　　　　Specification of Letters Patent.　　Patented Dec. 14, 1909.

Application filed January 11, 1909.　Serial No. 471,804.

*To all whom it may concern:*

Be it known that I, HARRY A. MILLER, a citizen of the United States, residing at Los Angeles, in the county of Los Angeles and State of California, have invented a new and useful Carbureter; of which the following is a specification.

This invention relates to carbureters principally intended for use in internal combustion engines, and the main object of the invention is to provide a device for this purpose wherein the incoming air will be confined or directed in such manner that a current of air of maximum velocity will always be presented in proximity to the oil inlet to the carbureter so that maximum entraining and atomizing effect is secured on the oil under all conditions of load and speed.

Another object of the invention is to provide for automatic control of the air supply so that the proper mixture will be furnished under all conditions.

Other objects of the invention will appear hereinafter.

The accompanying drawings illustrate the invention, and referring thereto, Figure 1 is a vertical section of the carbureter. Fig. 2 is an inverted plan view thereof. Fig. 3 is a plan of one of the controlling valve plates for the air inlet. Fig. 4 is a section on line $x^4$—$x^4$ in Fig. 1.

1 designates the body of the carbureter formed as a frusto-conical mixing chamber having a tubular extension adapted to be screwed at its upper end to the tubular fitting 2 which also serves as a throttle chamber, the throttle 3 being mounted in said fitting. The oil chamber is formed around the main chamber member 1 by a tubular shell or casing 5 that screws onto a threaded shoulder 6 of member 1 and is screw threaded at its upper end to receive the cap plate 7 which when screwed down on said cylinder shell and onto a shoulder 9 on the member 1 closes the top of the oil chamber 10. A float 11 movable vertically in the oil chamber is pivotally connected to an arm 12 pivotally mounted on a standard 13 on cap plate 7, said arm engaging the stem 14 of the oil inlet valve 15 which controls the oil inlet duct formed in a lug 17 on top of the cap member 7. Said oil inlet duct connects at one end with the oil supply pipe and at the other end it communicates into the oil chamber 10. Valve stem 14 slides in a tubular guide plug 18 which screws into a tapped opening extending upwardly into lug 17 aforesaid.

From the bottom of the oil chamber any desired number, for example, four, oil connections lead to an oil inlet in the mixing chamber of the carbureter. Each connection may consist of a tube 20 communicating at one end through a hollow stud 21 with the bottom of the oil chamber, the other end of said tube leading into a central tube 23 extending axially and vertically in the mixing chamber 24 which is formed within the body 1 of the carbureter. A valve stem 27 extends axially and vertically within this central tube, said valve stem having an operating handle 28 upon its lower end and passing through a stuffing box 29 at the lower end of the said tubular member. A portion of said valve stem is recessed or cut away, as shown at 30, in Figs. 1 and 4, to form passages to conduct the oil from the outlets 32 of the oil tubes 20 to the top of the tube 23, and the upper end of the valve stem is adapted to fit and close the upper end of the cylindrical bore of tube 23, the said recesses or channels 30 in the valve stem being gradually tapered at their upper ends so that vertical adjustment of the valve stem varies the amount of opening of each passage into the mixing chamber. Such vertical adjustment of the valve stem is provided for by a screw thread 35 formed in the tube 23 and on the ribs or portions of the valve stem between the vertical channels 30 aforesaid. A removable upwardly flaring sleeve 36 is slipped on the upper end of tube 23, and held by internal lugs 36' on said sleeve engaging in a groove 23' in said tube.

The bottom of the mixing chamber 1 is closed or partly closed by a plurality of wings 37, 38, 39 arranged in circular order around the bottom of the mixing chamber, each wing being mounted on a horizontal hinge or journal 40 and extending obliquely upward and inward toward the center of the mixing chamber, the inner ends of said wings being adapted to extend, when said wings are in most depressed condition, close to the central tube 23 so that the complete set of wings substantially closes the mixing chamber at the bottom. To provide for more effectual closure said wings are adapted to overlap, one of the wings, as 37, being adapted to overlie the two wings 38 at the respective sides thereof and said two wings being adapted to overlie the next wing or wings. In the form shown, where there are four wings, there will be one top wing, one bottom wing and two intermediate wings extending beyond the top and bottom wings. Said wings extend in different radial positions with respect to the air inlet, so as to occupy different portions of the air inlet and so that taken together they shut off the air inlet when they are in closed position, and the wings are hinged or pivoted at their outer ends on the walls of the air inlet by hinges 40. In order that the wings shall conform where they overlap, each wing is convexly curved so that the set of wings forms a conoidal structure. The inner edges or lips of the valve wings 37, 38, 39 are concavely curved, to enable them to present an approximately circular opening.

The position of the aforesaid air controlling means or valve members is controlled automatically by the suction through the mixing chamber, said suction acting in opposition to suitable means tending to hold the wings to closed position. Said means may consist, for example, of spring means acting on an arm 42 extending outwardly from the hub 43 of the top wing 37 and tending to press said top wing downwardly to closed position. This causes the top wing to press downwardly on the intermediate wings which in turn are pressed down onto the bottom wing 39. The downward movement is limited by suitable means, for example, a stop screw 44 engaging with an arm 45 extending outwardly from the hub 46 of said bottom wing. The arm 42 aforesaid is pivotally connected to a screw rod 48 on the upper end of which screws a nut 49, said nut having an outside thread 50 on which screws a screw collar 51, a helical spring 52 being provided between a flange 53 on the body 1 and the outer screw collar 51, and another helical spring 54 resting on said flange and extending upwardly within the spring 52 and into a cylindrical cavity 55 in the aforesaid nut 49. When the air valve is fully closed, in the position shown in Fig. 1 the spring 52 alone is in operation, tending to hold said valves in closed position, but when said valves open to a certain extent the nut 49 is pulled down by the rod 48 a sufficient distance to bring the top of the cavity 55 to bear on the supplementary spring 54 bringing the supplementary or accumulative spring into action to offer increased resistance to further opening of the air valve. A tube 57 extends over spring 52. Stop screws 44 may have a plunger 58 operated by a spring 59 to ease off the drop of the wings.

The operation is as follows: The outlet or throttle chamber 2 is attached to an internal combustion engine in the usual manner so that at each charging stroke of the engine suction will be applied in the mixing chamber 1. The oil or gasolene is supplied by suitable pipe connections through the oil passage 16 to the oil chamber 10 and when the oil in said chamber reaches a definite level the float 11 will operate to close the oil valve 15 shutting off further supply of oil, a definite level of oil being thereby secured in the oil chamber, this level being such that the oil will flow nearly to the top of the central tube 23. When the engine is at rest the oil valve member 27 is in its lowermost position so that none of the channels 30 therein extend above the tubular member 23 and oil is thus prevented from passing into the mixing chamber. When it is desired to operate the engine the handle 28 is turned to screw the valve member 27 upwardly, the tapering shape of the upper end of the channels 30 enabling any desired size of oil inlet opening to be thereby secured. At each suction stroke of the engine a condition of suction is produced within the mixing chamber 1 causing the air valve members 37, 38, 39 to be lifted, and as they rise they turn away from the member 23 so as to form between said member and the lips of said valve members an annular passage which serves as an air inlet, expanding or spreading as the valve members 37, 38, 39 rise. The air is drawn in through this annular air inlet close to the member 23 and to the oil inlet at the top thereof and the conical shape of the structure presented by the several valve members 37, 38, 39 causes the incoming air to tend to hug the central member 23 and to present a condition of maximum velocity directly adjacent to the oil inlet at the top of said member. At the same time the upwardly tapering shape of the oil inlet channels 30 in the oil valve member 27 serves to eject the oil in separate jets upwardly and outwardly into this concentrated current of air. As the valve members 37, 38, 39 open farther, under the condition of greater suction in the mixing chamber, more air will be admitted. In every case it will be confined as much as possible to the central part of the mixing chamber and in proximity to the oil inlet. Under condition of abnormal suction when the air controlling valve members 37, 38, 39 are nearly wide open it is desirable that their freedom of further opening should be restricted so as to provide for proper enrichment of the mixture, and for this purpose the supplementary spring 54 aforesaid is provided, said spring coming into operation under such conditions to produce cumulative resistance to the opening of the valve and thereby reduce the increase of opening of the valve members for a given increase of suction.

What I claim is:—

1. A carbureter comprising a mixing chamber, oil supply means provided with an inlet into said mixing chamber, said mixing chamber having an air inlet provided with a plurality of valve members movable simultaneously in the direction of the motion of the fluid through the carbureter, and opening in such direction by the suctional effect of said fluid, to form a variable air passage around and adjacent to the oil inlet, said valve members overlapping to maintain the condition of closure except at said passage.

2. A carbureter comprising a mixing chamber, oil supply means, a tubular member communicating with said oil supply means and extending into the mixing chamber to form an oil inlet, a valve member movable in said tubular member to control the oil inlet, said mixing chamber having an air inlet surrounding said tubular member, and valve wings controlling said air inlet and mounted on horizontal hinges and extending upward and inward from said hinges to form a conoidal structure, said wings being movable on said hinges toward and from said tubular member to spread or contract the air inlet opening directly around the tubular member and the oil inlet, said valve members overlapping to maintain the condition of closure except at said passage.

3. A carbureter comprising a mixing chamber, oil supply means having an oil inlet into said mixing chamber, said mixing chamber provided with an air inlet, and a plurality of movable valve wings at said air inlet, said valve wings extending in different radial positions relatively to the air inlet and being hinged to the walls of the air inlet at their outer ends and extending inward and upward from their hinges and adapted to move toward or from the oil inlet to spread or contract the size of the air inlet around the oil inlet, and said valve members overlapping to maintain the condition of closure except at said passage.

4. A carbureter comprising a mixing chamber, oil supply means provided with an inlet into said mixing chamber, said mixing chamber having an air inlet provided with a plurality of valve members movable simultaneously in the direction of the motion of the fluid through the carbureter, and opening in such direction by the suctional effect of said fluid, to form a variable air passage around and adjacent to the oil inlet, said valve members being movable automatically under control of the suction in the mixing chamber to expand the air inlet, and spring means tending to close said valve members, the spring means for each valve member comprising a plurality of spring devices brought successively into operation in the opening of the valve to produce cumulative resistance to such opening.

5. A carbureter comprising a mixing chamber, oil supply means, a tubular member communicating with said oil supply means and extending into the mixing chamber to form an oil inlet or valve member movable in said tubular member to control the oil inlet, said mixing chamber having an air inlet surrounding said tubular member, and movable valve means controlling said air inlet and movable toward and from said tubular member to spread or contract the air inlet opening directly around the tubular member and the oil inlet, said valve means formed as hinged wings overlapping one another and movable under the suction of the mixing chamber to expand the air inlet, and spring means operating on said valve means to close the same.

6. A carbureter comprising a mixing chamber, oil supply means, a tubular member communicating with said oil supply means and extending into the mixing chamber to form an oil inlet or valve member movable in said tubular member to control the oil inlet, said mixing chamber having an air inlet surrounding said tubular member, and movable valve means controlling said air inlet and movable toward and from said tubular member to spread or contract the air inlet opening directly around the tubular member and the oil inlet, said valve means formed as hinged wings overlapping one another and movable under the suction of the mixing chamber to expand the air inlet, spring means operating on one of the wings, and tending to close all the wings, and stop means engaging with another of the wings to limit the closing movement.

In testimony whereof, I have hereunto set my hand at Los Angeles, California, this 31st day of December 1908.

HARRY A. MILLER

In presence of—
ARTHUR P. KNIGHT,
FRANK L. A. GRAHAM.